United States Patent
Ngan et al.

(10) Patent No.: US 6,973,312 B1
(45) Date of Patent: Dec. 6, 2005

(54) METHOD AND SYSTEM OF IDENTIFYING CELLS IN WHICH TO APPLY A CARRIER FREQUENCY

(75) Inventors: John Cheong-Wai Ngan, Shawnee, KS (US); Shiva Narayanabhatla, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 543 days.

(21) Appl. No.: 10/198,382

(22) Filed: Jul. 18, 2002

(51) Int. Cl.$^7$ .......................... H04B 7/216; H04Q 7/36
(52) U.S. Cl. ...................... 455/442; 455/447; 455/453; 370/331; 370/334
(58) Field of Search .............................. 455/442–443, 455/445–448, 452.2, 453, 436, 437–438; 370/331–332, 370/334

(56) References Cited

U.S. PATENT DOCUMENTS

| | | | |
|---|---|---|---|
| 5,640,676 A * | 6/1997 | Garncarz et al. | 455/436 |
| 5,946,621 A * | 8/1999 | Chheda et al. | 455/440 |
| 6,108,548 A * | 8/2000 | Furukawa et al. | 455/442 |
| 6,201,968 B1 * | 3/2001 | Ostroff et al. | 455/436 |
| 6,654,612 B1 * | 11/2003 | Avidor et al. | 455/450 |
| 6,714,789 B1 * | 3/2004 | Oh et al. | 455/456.1 |
| 6,778,833 B1 * | 8/2004 | Fortuna | 455/446 |

* cited by examiner

Primary Examiner—William Trost
Assistant Examiner—Brandon J. Miller

(57) ABSTRACT

A method and system of identifying cells in which to apply a carrier frequency. A wireless communication system may be comprised of cells, which are divided into sectors. A list of sectors of the system that require additional capacity may be compiled and a carrier frequency may be applied to a selected group of those sectors. The sectors may be selected based on a distance between each other and/or based on a probability of handoff from one another, for instance.

28 Claims, 7 Drawing Sheets

METHOD AND SYSTEM OF IDENTIFYING CELLS IN WHICH TO APPLY A CARRIER FREQUENCY

BACKGROUND

A. Field of Invention

The present invention relates to wireless communication systems, and more particularly, to a method and system for identifying cells in which to apply a carrier frequency.

B. Description of Related Art

In a typical wireless communication system, an area is divided geographically into a number of cell sites that are each defined by one or more radio frequency (RF) radiation patterns from a respective base transceiver station (BTS) antenna. Most cell sites are usually further divided geographically into a number of sectors that are each defined respectively by radiation patterns from directional antenna elements of the respective BTS antenna. The radiation pattern of each sector in a cell site produces an air interface that defines a respective coverage area.

Cell sites of the typical wireless communication system are operated by one or more wireless service providers (WSP). A WSP is a company that provides telecommunications through RF signals rather than (or in addition to) through end-to-end wire communication. A WSP may transmit signals using one or more carrier frequencies. A carrier frequency (or simply "carrier") is a transmitted electromagnetic pulse at a steady frequency of alternation on which information can be imposed by increasing signal strength, varying the frequency, or other means. When a cell site is operated by WSPs with multiple carrier frequencies, the cell site may be considered to have a multiple of its number of sectors. For instance, if a cell site is divided into three sectors by directional antenna elements, and the cell site is operated by a WSP that uses four carrier frequencies, then the cell site may effectively have twelve sectors, three operating at each of the four carrier frequencies.

If WSPs of cell sites in a system use many different carrier frequencies, functional problems may result since a mobile station may have to change carrier frequencies as it travels through the wireless communication system.

In addition, cell sites of the wireless communication system might only support a limited amount of wireless signal traffic, based at least in part on the number of carrier frequencies used by the WSPs operating the cell sites. With an increase in telecommunications traffic, cell sites of the typical wireless communication system may then need to be upgraded so as to support additional wireless signal traffic.

One approach to upgrading cell sites of a system is by adding carrier frequencies. However, when introducing new carrier frequencies to cell sites of a system, functional issues, such as mobile station usage of multiple carrier frequencies, must be considered. Consequently, it is desirable to provide a method and system to overcome these problems.

SUMMARY

The present invention provides a mechanism for identifying cell sites where a carrier frequency should be added (or where an existing carrier frequency should be changed) in a wireless communication system. The mechanism can take the form of a computer program executed by a processor.

Generally speaking, in accordance with an exemplary embodiment, the processor may receive input data indicative of sectors that are in need of capacity improvement. And the processor may manipulate that data, based on knowledge of other information, to identify cell sites on which a new carrier frequency should be added or otherwise altered.

More particularly, in one respect, an exemplary method may involve initially receiving a first list of sectors. Each sector in the first list may be deemed to require some capacity improvement (possibly due to insufficient performance in the past). Next, the method may involve establishing a second list of all sectors in the first list that are each within a predefined distance of at least one other sector in the first list. In turn, the method may involve applying a predetermined carrier frequency in all cells that encompass at least one of the sectors in the second list. A carrier frequency may be applied to a cell by programming the cell to communicate with a mobile station using the carrier frequency.

In another respect, the exemplary method may involve initially receiving a first list of sectors. Each sector in the first list may be deemed to require some capacity improvement. Each sector in the first list may also have a respective "neighbor set" comprising sectors that may be within a predefined distance. The method may then involve establishing a second list of all sectors in the first list that are within a predefined distance of at least one other sector in the first list. And, in turn, for each given sector in the second list, the method may involve identifying a subset of the sector's neighbor set. The subset defines sectors that do not share a common cell with the given sector, sectors that have at least some predetermined probability of handoff from the given sector, and sectors that are not in the first list of sectors. Finally, for each subset, the method may involve applying a predetermined carrier frequency in all cells that encompass at least one sector in the subset.

These as well as other features and advantages will become apparent to those of ordinary skill in the art by reading the following detailed description, with appropriate reference to the accompanying drawings.

DETAILED DESCRIPTION OF EXEMPLARY EMBODIMENTS

In accordance with an exemplary embodiment, a method and system for identifying cells in which to apply a carrier frequency in a wireless communication system, such as a cellular communication network for instance, is provided.

A. Wireless Communication System

Figure 1:
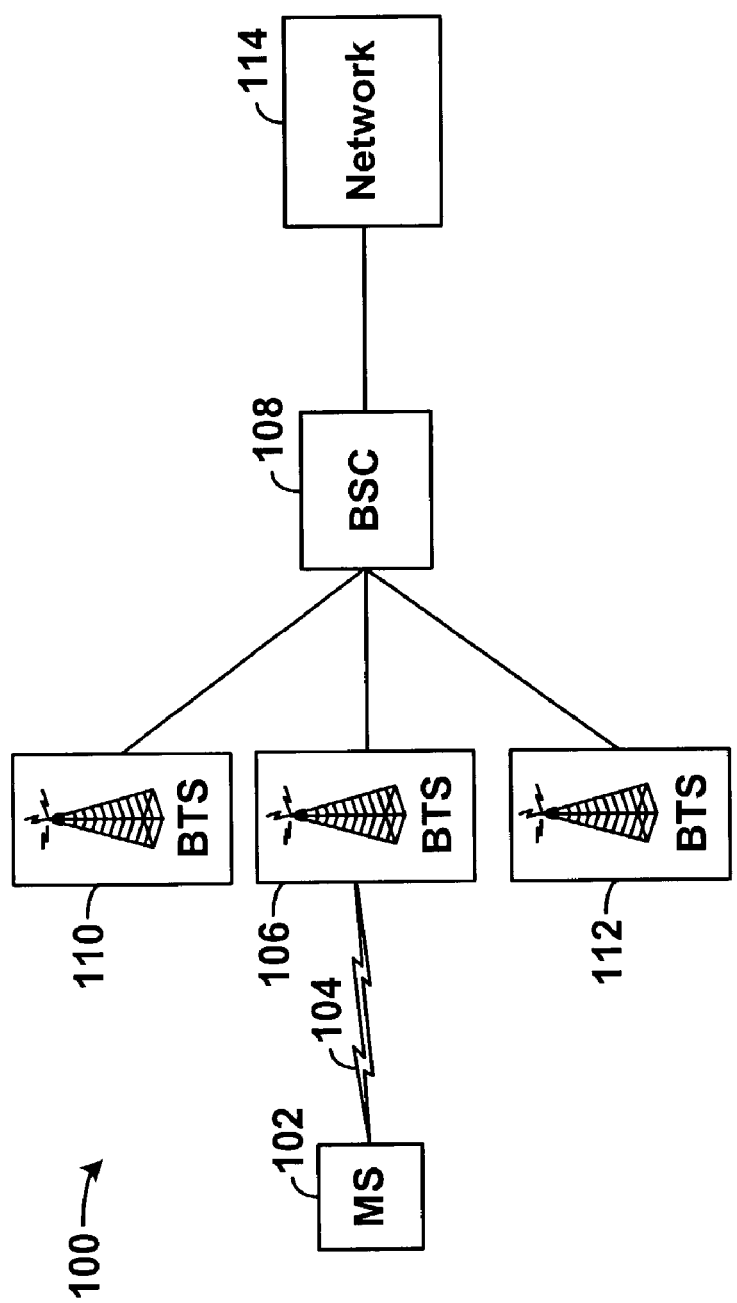
FIG. 1 is a block diagram illustrating one embodiment of a wireless communication system.

Referring now to the figures, FIG. 1 is a block diagram illustrating one embodiment of a wireless communication system 100. It should be understood that this and other arrangements described herein are set forth for purposes of example only, and other arrangements and elements can be used instead and some elements may be omitted altogether. Further, as in most telecommunications applications, those skilled in the art will appreciate that many of the elements described herein are functional entities that may be implemented as hardware, firmware and/or software, and as discrete components or in conjunction with other components, in any suitable combination and location.

By way of example, the wireless communication system 100 is shown to include a mobile station (MS) 102 in communication via an air interface 104 with a BTS 106, which is coupled to a base station controller (BSC) 108. The BSC 108 is also coupled to a network 114. MSs such as cellular telephones, personal digital assistants (PDA), wireless modems, or other mobile nodes may be used in the wireless communication system 100. Additional BTSs 110 and 112 coupled to BSC 108 are also illustrated. Although three BTSs are illustrated within FIG. 1, it will be understood that more or fewer BTSs may be present within the wireless communication system 100.

BTS 106 includes one or more antennas arranged to produce radiation patterns defining one or more sectors. The antennas may be any antenna desired and may for example, comprise antenna arrays.

BSC 108 is an interface between BTSs 106, 110, and 112 and the network 114. BSC 108 may also handle radio resource management and radio network management functions for BTSs 106, 110, and 112.

The network 114 may be any transport network and/or entity used to route signals to and from the MS 102. For example, the network 114 may include connections to a mobile switching center (MSC), a packet data service node (PDSN), an Internet protocol (IP) network, the public switched telephone network (PSTN), or any other wireless communication transport network. In addition, network 114 may allow for connectivity to multiple switching platforms, such as a short message service center (SMSC) and/or an uplink server, for example.

Each of the couplings of the wireless communication system 100, excluding the air interface 104, may be an interface such as a trunk level 1 (T1) line, an Ethernet line, a signaling link, or other connections (whether wired or wireless).

The wireless communication system 100 may be divided geographically into a number of cell sites (or simply "cells"). At the core of each cell is a BTS, such as BTSs 106, 110, or 112, whose antennas define the RF radiation pattern of the cell. Further, each cell may be divided into a number of sectors, each defined respectively by radiation patterns from directional antenna elements of the cell's BTS. Each sector typically has a beam width of about 120 degrees. However, sectors can have any desired beam width.

The radiation pattern of each sector in a cell produces an air interface, such as air interface 104, that defines a respective coverage area. When an MS is positioned within such a coverage area of a sector in a cell, the air interface provides a communication path between the MS and the BTS. And the MS can then communicate through this path with entities on the network 114.

In the wireless communication system 100, WSPs of the BTSs 106, 110, and 112 may transmit signals using one or more carrier frequencies. The signals can be imposed onto the carrier frequencies using any form of modulation, such as for example amplitude modulation (AM), frequency modulation (FM), phase modulation, or others.

In operation of the wireless communication system 100, when the MS 102 is within a sector of a cell defined by the BTS, the MS 102 may communicate with the BTS 106 through the air interface produced by the sector using a carrier frequency of the cell. As the MS 102 travels from that sector into another or from that cell into another, the wireless communication system 100 may automatically switch the MS's point of contact with the system 100 from BTS 106 to another. Each BTS transition, as well as the switching process or sequence itself, is referred to as a "handoff".

In one instance, if the MS 102 is in communication with BTS 106 and the MS 102 moves into a new coverage area, (for example, a cell produced by BTS 110), through communication with the BSC 108, the MS 102 may change to communicate on a different carrier frequency with BTS 110. This is referred to as a "hard" handoff. A hard handoff occurs when the MS 102 changes frequencies when traveling through the wireless communication system 100. A temporary disconnection of communication between an MS and a BTS sometimes characterizes a hard handoff.

In another instance, if the MS 102 is in communication with a sector of BTS 106 and the MS 102 moves into another sector of another BTS and does not change carrier frequencies, through communication with the BSC 108, the MS 102 may simply switch sectors (i.e., air interfaces) in order to communicate with the other BTS. A handoff from a sector of a BTS to another sector of another BTS without changing carrier frequencies is referred to as a "soft" handoff.

In still another instance, if the MS 102 is in communication with a sector of BTS 106 and the MS 102 moves into another sector of BTS 106, the MS 102 may continue to communicate with BTS 106 in the other sector without changing carrier frequencies. Through communication with the BTS 106, the MS 102 may simply switch sectors of BTS 106 in order to complete the handoff from the one sector to the next. This type of handoff is referred to as a "softer" handoff.

Handoff between cells may be based upon a distance between the cells (i.e., the distance between the BTSs at the core of the respective cells). For example, a hard handoff is usually completed between cells that are far apart. However, if cells are too far apart, then no handoff may be possible. Alternatively, a soft handoff is usually completed between cells that are within a short distance of one another.

B. Operation and Arrangement of Cells

Cells of the wireless communication system 100 that are operated by WSPs who use more than one carrier frequency may be considered to have a multiple of their number of sectors. FIG. 2A illustrates one embodiment of a conceptual cell 200. The cell 200 is divided into three sectors A, B, and C, which are each produced by radiation patterns of antenna elements. The cell 200 may be operated by a WSP that has three carrier frequencies (e.g., 200 MHz, 300 MHz, and 400 MHz), which are represented by three layers 202, 204, and 206. The cell 200 may effectively have nine sectors, three operating at each of the three carrier frequencies.

Figure 2B:
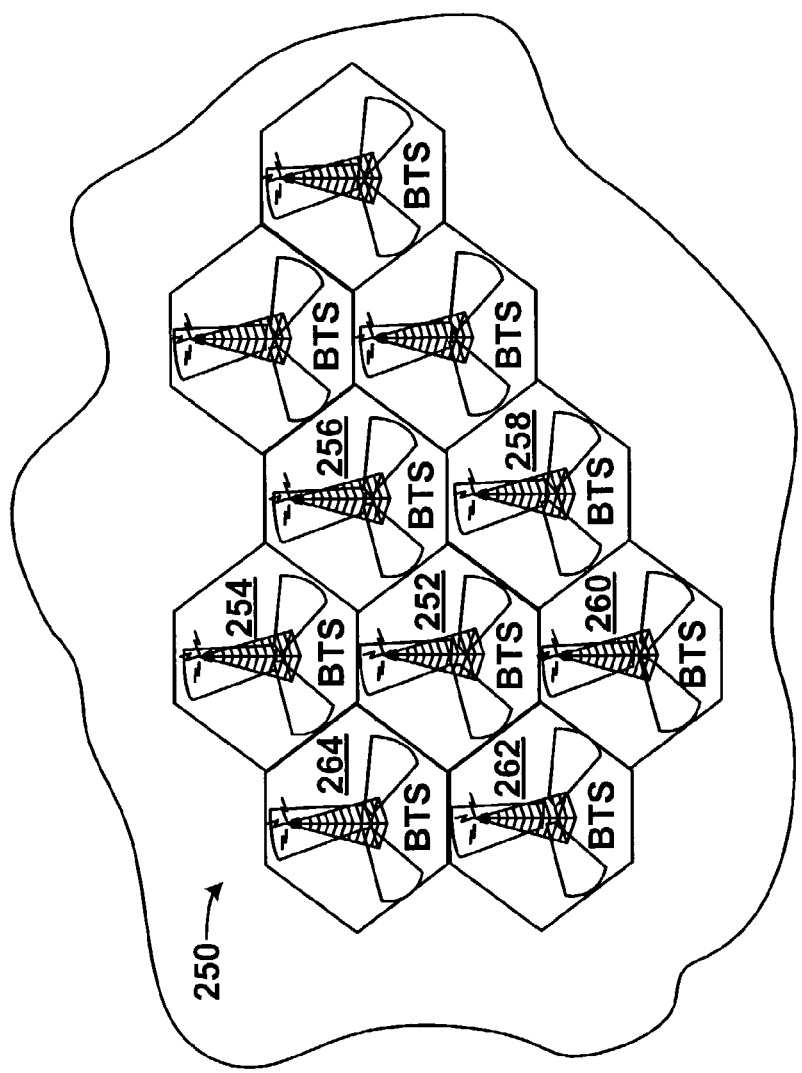
FIG. 2B illustrates one embodiment of a conceptual multi-cell configuration.
Figure 2A:
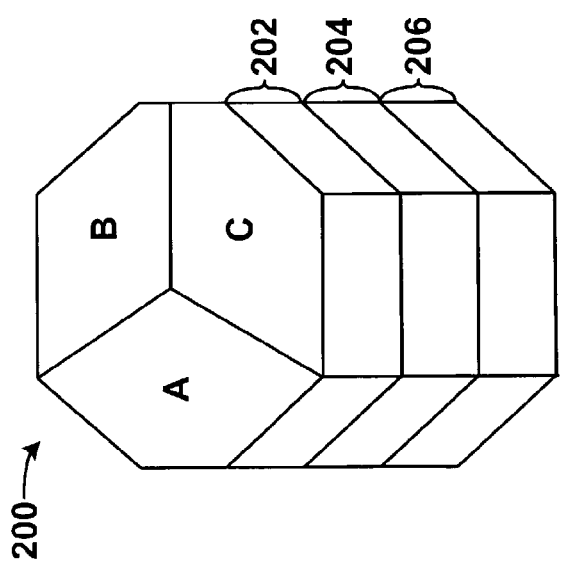
FIG. 2A illustrates one embodiment of a conceptual cell.

FIG. 2B illustrates one embodiment of a conceptual multi-cell configuration 250. The cell configuration 250 is divided into multiple cells, each modeled as a hexagon. The cell configuration 250 includes multiple BTSs, such as BTSs 252, 254, 256, 258, 260, 262, and 264, that each has a coverage area represented as a hexagon. However, the coverage areas may be modeled in any form desired. BTSs may be positioned throughout an area in a manner such that each hexagon abuts one another, although overlap may also exist to provide a higher quality of service. Alternatively, BTSs may be positioned further apart from one another in order to provide wireless services to a larger area.

FIG. 2B illustrates the BTSs positioned at the center of their coverage areas (i.e., hexagons). However, the BTSs may be positioned at a corner of a hexagon or at any other area of a hexagon as well. Each BTS of the cell configuration 250 is also illustrated with three sectors, represented as pie-shaped sections of their coverage areas. An MS may travel through the cell configuration 250 and communicate with each BTS through its respective coverage area.

The cells of the cell configuration 250 may be arranged in "tiers". A tier of cells is a row or layer of cells. For example, BTS 252 may have an outer tier of cells (or a surrounding layer of cells) defined by BTSs 254, 256, 258, 260, 262, and 264. The outer tier may be represented by cells that are within a predefined distance from the BTS 252. The outer tier may also define cells from which an MS may handoff from BTS 252 without interruption in wireless signaling for the MS (i.e., a soft handoff). Therefore, the outer tier may represent cells which the BTS 252 has a high probability of handoff. A high probability of handoff between two cells may be determined to exist once a predefined number (or percent) of successful handoffs occurs from the BTS of one cell to the BTS of the other cell. Cells comprising an outer tier of a given cell may be any distance away from the given cell as long as the given cell may handoff MSs to any of the outer tier cells.

A BTS may handoff an MS to any BTS that is within a predefined distance. However, if an MS has to change carrier frequencies during handoff, communications between the MS and the system may be interrupted and/or discontinued, such as typically occurs in a hard handoff. Therefore, the MS may prefer to use the same carrier frequency to communicate with the system while traveling throughout the system in order to avoid this problem.

Also, communications between the MS and the system may be interrupted or discontinued if the system becomes "overloaded" with MSs. This can occur if more than a desired amount of MSs enter into the system at any one instance. The system can only support a limited amount of MSs at the same time, thus when more than this amount become active in the system, they may not be able to receive services from the system. This is due to the fact that cells of the wireless communication system 100 might only support a limited amount of wireless signal traffic, which may be based at least in part on the number of carrier frequencies used by the WSPs operating the cells. Therefore, in one instance, to increase capacity, additional carrier frequencies may be applied to a cell by either adding a new carrier frequency to the cell or re-tuning an existing carrier frequency of the cell. Other types of carrier additions or carrier overlay may be used as well. However, when applying carrier frequencies to cells of the wireless communication system 100, handoff and other functional issues involving interruptions in communication, may need to be considered.

C. System to Identify Cells in which to Apply a Carrier Frequency

In an exemplary embodiment, optimal and/or advantageous cells of the wireless communication system 100 in which to apply (e.g., add) a carrier frequency may be identified. A listing of cells in which a carrier frequency may be applied is compiled. The listing of cells may include existing cells of the wireless communication system 100 that have been deemed to require additional capacity. The listing of cells may also include, for example, cells that have only a limited number of carrier frequencies operated at the cells. Furthermore, the listing of cells may also include cells selected from the wireless communication system 100 based on past performance of the cells, based on future projections of wireless signal traffic on the cells, or based on other information of the wireless communication system 100.

Also, cells of future planned cells to be added to the wireless communication system 100 may be included into the listing of cells in which a carrier frequency may be applied. Cells of the future planned cells that are included in the listing may be identified based on estimated call models and/or traffic projections on the planned cells.

Figure 3:
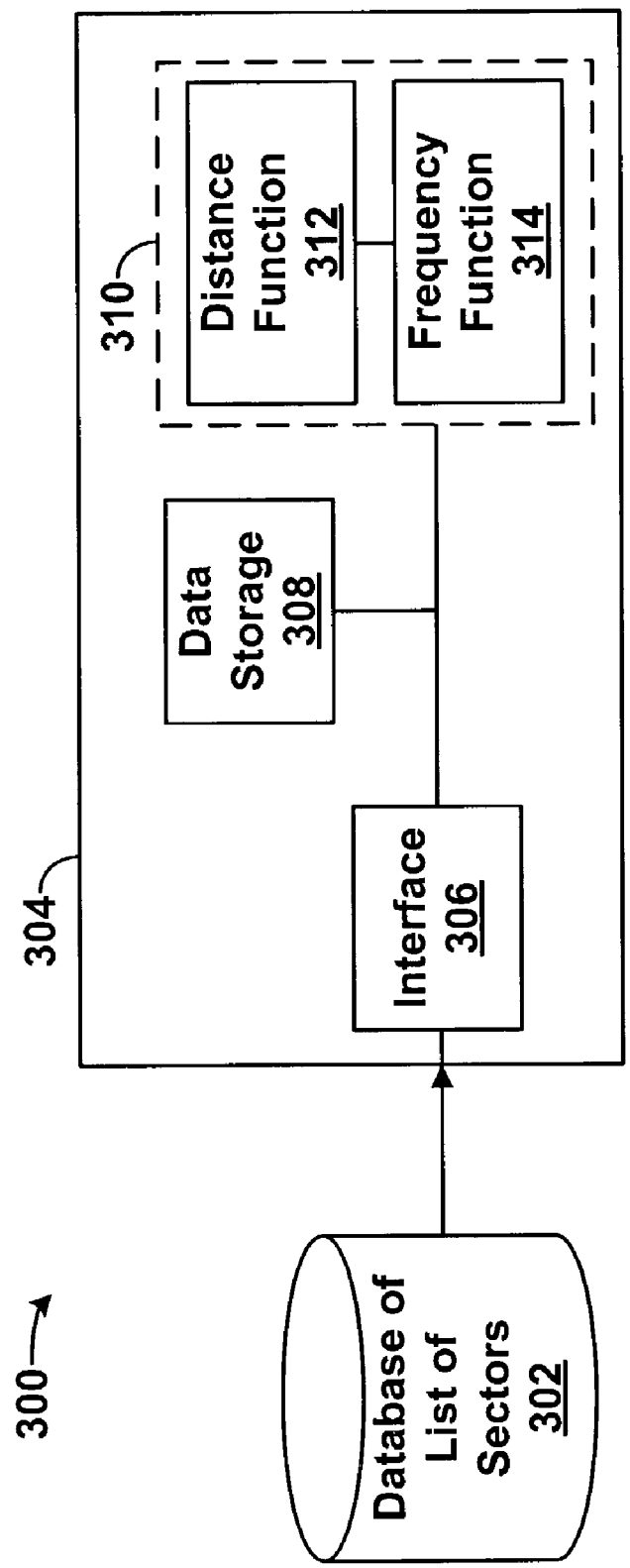
FIG. 3 is a block diagram illustrating one embodiment of a system to identify cells of a wireless communication system in which to apply a carrier frequency.

FIG. 3 is a block diagram illustrating one embodiment of a system 300 to identify cells of the wireless communication system 100 in which to apply a carrier frequency. The system 300 may include a database that stores a list of sectors 302 and a computer 304. The computer 304 may include an interface 306, data storage 308, and a processing unit 310, which may all be connected. Other equipment may also be included in the computer 304. The processing unit 310 may include a distance function 312 and a frequency function 314.

The list of sectors 302 may include sectors that require additional capacity. For example, sectors that have a history of "dropped calls" (i.e., a loss of communication or a failure of the air interface between an MS and a BTS) may be deemed as sectors that require additional capacity. Other sectors such as those comprising coverage areas of expanding neighborhoods and cities may also be deemed as sectors that require additional capacity. The list of sectors 302 may include geographic and/or system information for each sector in the list. For example, each sector in the list of sectors 302 may be listed with information such as a sector number, sector coordinates (i.e., latitude and longitude), a cell number, a BTS number, a capacity of the sector, carrier frequency(ies) of the sector, and/or an estimated number of carrier frequencies required in the future. Each sector in the list of sectors 302 may also be listed with other information as well, such as a list of neighboring cells or geographically adjacent cells or a list of an outer tier of a surrounding layer of cells. The database that stores the list of sectors 302 may also store other information regarding the wireless communication system 100 as well. The list of sectors 302 may also be a list of all sectors in the wireless communication system 100.

The computer 304 may output a graphical representation of cells of the wireless communication system 100 that require additional capacity on a display (not shown), such as a standard computer screen or other display. Also the computer 304 may identify on the display those cells into which a carrier frequency should be applied.

The interface 306 of the computer 304 may be any standard computer interface and may include, for example, a keyboard. However, other interfaces may be used as well. The list of sectors 302 may be input into the computer 304 through the interface 306.

The data storage 308 may include main memory and secondary storage. The main memory may include random access memory (RAM). Main memory can also include any additional or alternative memory device or memory circuitry. Secondary storage can be provided as well and may be persistent long term storage, such as read only memory (ROM), optical or magnetic disks, compact-disc read only memory (CD-ROM), or any other volatile or non-volatile storage systems. The list of sectors 302 may be input into the computer 304 and stored in the data storage 308.

The processing unit 310 may operate according to an operating system, which may be any suitable commercially available embedded or disk-based operating system, or any proprietary operating system. The processing unit 310 may comprise one or more smaller central processing units, including, for example, a programmable digital signal processing engine. The processing unit 310 may also be implemented as a single application specific integrated circuit (ASIC) to improve speed and to economize space.

The distance function 312, the frequency function 314, and additional functions if present, of the processing unit 310 may be provided using machine language instructions or software with object-oriented instructions, such as the C++ programming language. However, other programming languages (such as the C programming language for instance) could be used as well.

D. Method of Identifying Cells in which to Apply a Carrier Frequency

Figure 4:
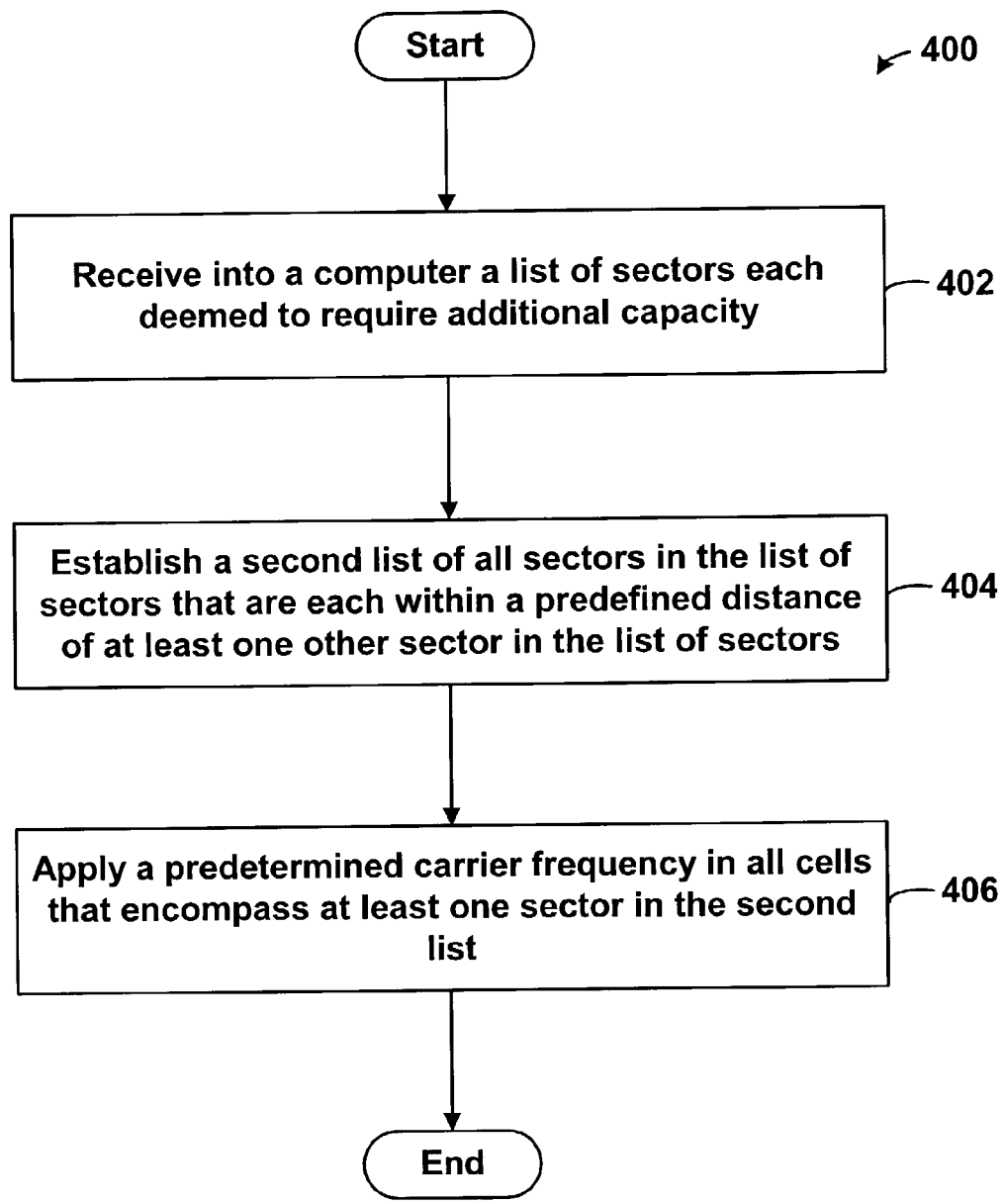
FIG. 4 is a flowchart depicting functional blocks of a method according to one embodiment.

FIG. 4 is a flow chart illustrating a method 400 for identifying cells in the wireless communication system 100 in which to apply a carrier frequency, according to the exemplary embodiment. Initially, the computer 304 may receive the list of sectors 302 as shown at block 402. (For example, a person could enter the list 302 into the computer 304). Each of the sectors within the list 302 may be deemed to require additional capacity. Alternatively, the list of sectors 302 may comprise all sectors in the wireless communication system 100 and the processing unit 302 may select sectors that require additional capacity based at least in part on a number of carrier frequencies in use on the sectors, based on a current capacity of the sector, or based on other system and/or geographic information.

The distance function 312 of the processing unit 310 may then be executed to establish a second list of all the sectors that are in the list of sectors 302 that are each within a predefined distance of at least one other sector in the list of sectors 302, as shown at block 404. For example, the distance function 312 may be executed by the processing unit 310 to select sectors from the list of sectors 302 that are within 5 miles of each other. The distance function 312 may determine the distance between each sector of the list of sectors 302 in order to select sector-pairs that are within the predefined distance. The distance between each sector may be determined using sector coordinates (i.e., latitude and longitude), for example. This second list of sectors may then be stored in the data storage 308.

The frequency function 314 of the processing unit 310 may then be executed to apply a predetermined carrier frequency in all cells that encompass (i.e., contain) at least one sector in the second list, as shown at block 406. The frequency function 314 may apply a predetermined carrier frequency by assigning a new carrier frequency to the cells that include sectors of the second list or by re-tuning an existing carrier frequency of these cells. A carrier frequency of a cell may be "retuned" by changing the carrier frequency to a new value; possibly one that is not in use at or near the cell. Each sector in the list of sectors 302 may have an assigned carrier frequency and the predetermined carrier frequency that is applied to the cells that include sectors of the second list may be different from the assigned carrier frequency.

In one instance, by applying a carrier frequency to cells, the computer 304 may program the cells to communicate using this carrier frequency (along with any existing carrier frequencies on the cells). The computer 304 may also apply a carrier frequency to a cell by simply outputting an indication instructing a technician, or other device, to arrange the cell to operate using the designated carrier frequency. The computer 304 may apply a carrier frequency in other manners as well.

When a carrier frequency is applied to a cell that encompasses at least one sector of the second list, the carrier frequency may, in fact be applied to all sectors of that cell. Therefore, a large increase in the cell's capacity may be obtained. BTSs of the cells in which the predetermined carrier frequency is applied may communicate with MSs using this applied carrier frequency.

In addition, each cell that encompasses a sector of the second list may have one or more neighboring cells. The neighboring cells may be defined as adjacent cells and/or cells that have a predetermined probability of handoff from a cell. The probability of handoff may be determined from a defined distance away from a cell. A list of neighboring cells may also be stored in the database containing the list of sectors 302 or the list of neighboring cells may be stored in a separate database of the system 300. To further increase capacity of cells on the wireless communication system 100, the computer 304 may also apply the predetermined carrier frequency to the one or more neighboring cells.

Figure 5:
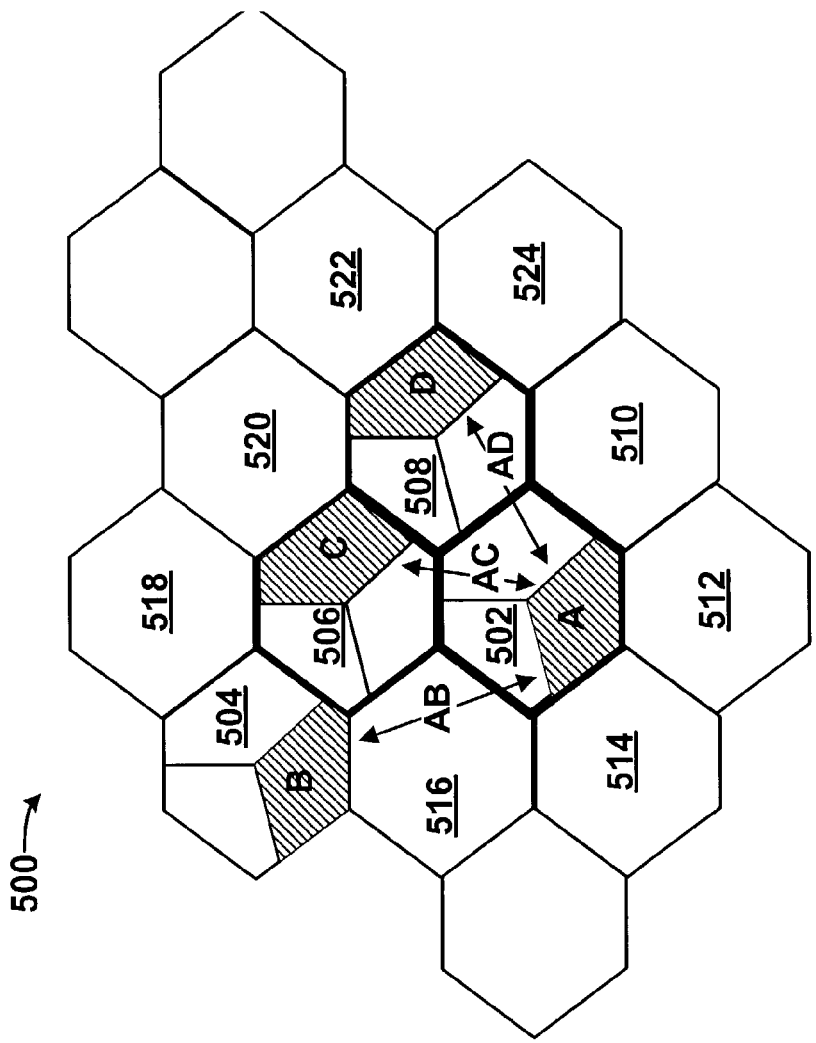
FIG. 5 is an illustration depicting the method of FIG. 4.

FIG. 5 is an illustration depicting this method designated by reference numeral 400. FIG. 5 illustrates a cell configuration 500 that has cells 502, 504, 506, 508, 510, 512, 514, 516, 518, 520, 522, 524, and additional other surrounding cells. Each cell of the cell configuration 500 may be divided into three sectors. For example, cells 502, 504, 506, and 508 are each divided into three sectors. Any of the sectors may be deemed to require additional capacity.

As an example, sector A of cell 502, sector B of cell 504, sector C of cell 506, and sector D of cell 508 may each require additional capacity (these sectors are illustrated as shaded sectors). Sectors A, B, C, and D may comprise the list of sectors 302 and may be input into the computer 304. The distance function 312 of the processing unit may be executed to determine the distance between each of these sectors. For example, using sector A, the distance function 312 may determine the distance between sector A and sector B, illustrated in FIG. 5 as the vector AB. The distance function 312 may also determine the distances between sectors A and C (i.e., vector AC), and sectors A and D (i.e., vector AD). The distance function 312 may then determine the distances between the other remaining sectors, such as distances between sectors B to C (BC), sectors B to D (BD), and sectors C to D (CD) (vectors BC, BD, and CD not illustrated in FIG. 5).

The distance function 312 may then compare these distances (i.e., AB, AC, AD, BC, BD, and CD) with a predefined distance, such as 5 miles. If any of these distances are less than and/or equal to 5 miles, then a carrier frequency may be applied to the cells encompassing the sectors between which the distances were determined. For example, distances AC and AD may be less than the predefined distance. The frequency function 314 may then be executed by the processing unit 310 to apply a predetermined carrier frequency to the cells encompassing sectors A, C, and D (i.e., cells 502, 506, and 508).

The predetermined carrier frequency may be the same for all cells 502, 506, and 508 or a different carrier frequency may be applied to each cell. In either instance, applying a carrier frequency to these cells may increase capacity of these cells. However, to lessen hard handoff between cells 502, 506, and 508, it may be desirable to apply a common carrier frequency to all of these cells so that an MS traveling through coverage areas of these cells will not have to change carrier frequencies.

Cells 504, 510, 512, 514, 516, 518, 520, 522, and 524 may each be identified as neighboring cells of at least one or all of the cells 502, 506, and 508. The predetermined carrier frequency may also be applied to these neighboring cells. The neighboring cells may comprise a first outer tier of the cells 502, 506, and 508.

Figure 6:
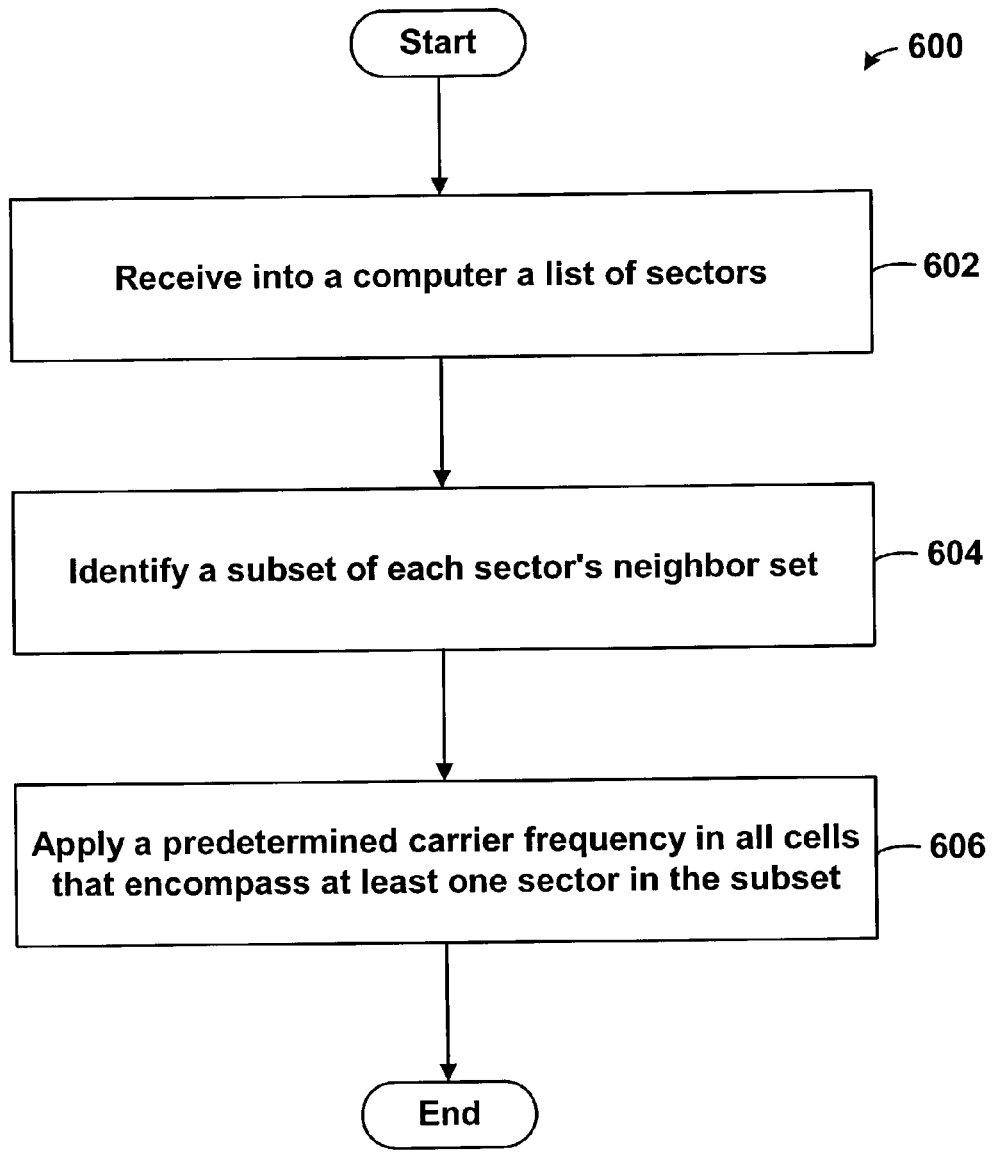
FIG. 6 is a flowchart depicting functional blocks of a method according to one embodiment.
Figure 7:
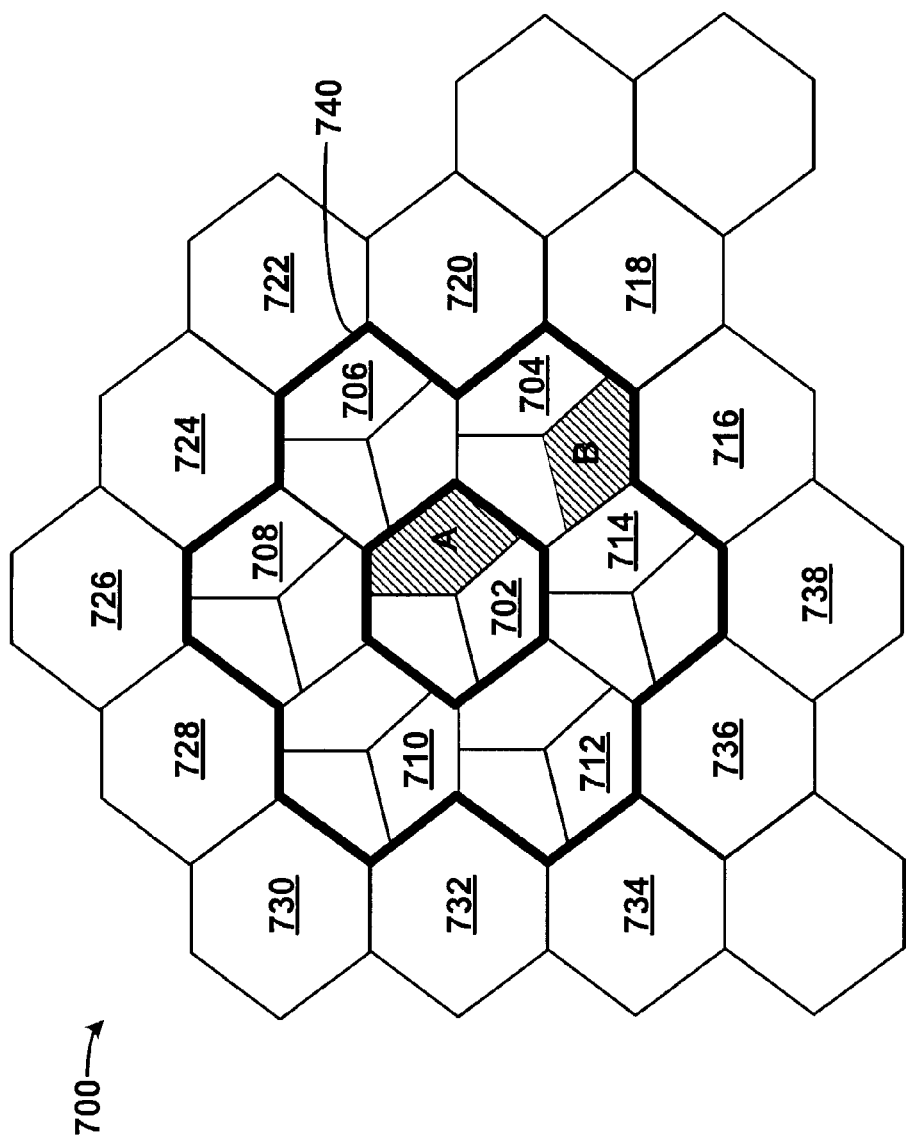
FIG. 7 is an illustration depicting the method of FIG. 6.

FIG. 6 is a flowchart illustrating another embodiment of a method 600 for identifying cells in the wireless communication system 100 in which to apply a carrier frequency. FIG. 7 is an illustration depicting this method designated by reference numeral 600. FIG. 7 illustrates a conceptual cell configuration 700 that has cells 702–738 (illustrated with references numbers incremented by two). Each cell of the cell configuration 700 may be divided into three sectors. For example, cells 702, 704, 706, 708, 710, 712, and 714 are each divided into three sectors.

As shown at block 602, the computer 304 receives the list of sectors 302. Each given sector in the list of sectors 302 may also be listed with a respective neighbor set of sectors. The respective neighbor set of sectors defines neighbor sectors of the given sector. Each neighbor sector may have a respective probability of handoff from the given sector and/or may be within a predefined distance of the given sector. Neighbor sectors may also be defined as the nearest adjacent surrounding sectors of a given sector. Each sector of a typical wireless communication system may have 20 neighbor sectors. However, each given sector of the list of sectors 302 may have more of fewer than 20 neighbor sectors.

Each sector of cells in the cell configuration 700 may have a respective neighbor set of sectors or cells. For example, a neighbor set of sector A in cell 702 may include all sectors within cells 704, 706, 708, 710, 712, 714, and the two additional sectors of cell 702. The neighbor set may also include all sectors within other cells, such as those within cells 716–738.

As an example, the list of sectors 302 may comprise sector A of cell 702 and sector B of cell 704, and may be input into the computer 304. Sector A may be in the list of sectors and listed with its neighbor set of sectors, i.e., the sectors in cells 704–738, and the two additional sectors of cell 702, and sector B may listed with its neighbor set of sectors, which may be all sectors in cells 702, 706, 714, 716, 718, 720, and the two additional sectors of cell 704.

As shown at block 604, the computer 304 identifies a subset of each sector's neighbor set. The subset of a given sector may advantageously exclude sectors that share a common cell with the given sector. For instance, if the given sector belongs to a cell that has three sectors, the subset of the given sector's neighbor set could exclude the other two sectors of the cell. The computer 304 could then not select the other two sectors of the cell to be included in the subset. This may eliminate redundancy of representation of cells in the subset.

The subset of the given sector's neighbor set may also or alternatively only include sectors that have at least a predetermined probability of handoff from the given sector. The predetermined probability of handoff may be defined as any desired value and may be determined based upon a desired quality of service. The probability of handoff may also be determined based on a distance between sectors. The probability of handoff can be defined as the likelihood that a sector can handoff an MS to another sector without interruption and/or without a discontinuation of communication with the system and the likelihood may based on previous performance of the sectors or simply a matter of judgment.

A given sector's neighbor set may have sectors arranged in an order of probability of handoff from the given sector. For example, sectors of the neighbor set that have a high probability of handoff from the given sector may be arranged at the beginning of the neighbor set. These sectors may have a high probability of handoff because based on past performance, it may be established with reasonable confidence that an MS may switch between these sectors and the given without in order to communicate with the system without an interruption in communication. The computer 304 may then select the first few sectors of the neighbor set the subset, since the first few sectors will have the highest probability of handoff from the given sector using this arrangement. However, a given sector's neighbor set may be arranged in any manner, such as a matrix where rows and columns containing sectors may define probabilities of handoff from one another and from the given sector.

In addition, the subset of the given sector's neighbor set could omit sectors that are also in the list of sectors 302 initially received at the computer 304. For example, the computer 304 may compare the given sector's neighbor set with the list of sectors 302 and the computer 304 could programmatically not select sectors that are in both the neighbor set and the list of sectors 302 to be within the subset. This may facilitate sorting of the sectors more rapidly and eliminate redundancy of representation of cells. For example, since method 600 may be applied to each sector's neighbor set of the list of sectors 302, all sectors in the list of sectors 302 may each be subjected to carrier addition multiple occasions. However, by removing sectors of the list of sectors 302 from the subset of a given sector's neighbor set, the sectors of the list of sectors 302 may initially not be subjected to carrier addition at all. In this manner, the computer 304 may consider the sectors of the list of sectors 304 for carrier addition separately from the sectors within neighbor sets in order to improve processing efficiency.

The redundancy of cells listed in the subset may slow down the processing of the computer 304, since the computer 304 may be sorting through a large number of cells. Therefore eliminating redundant sectors and/or cells may reduce the amount of sectors that the computer 304 sorts through, resulting in a more efficient method of identifying cells in which to apply a carrier frequency.

In addition, by eliminating sectors of the list of sectors 302 from the subset of a neighbor set, a single outer tier of cells surrounding all sectors of the list of sectors 302, rather than (or in addition to) individual outer tiers surrounding each sector of the list of sectors 302 may be identified. The single outer tier of cells may be a concentric circle (or other similar shape) of cells surrounding sectors of the list of sectors 302.

Referring to the example in combination with FIG. 7, the computer 304 may identify a subset of sector A's neighbor set as indicated by block 604 of FIG. 6. The subset may include all sectors of sector A's neighbor set excluding the two additional sectors in cell 702 because they share a common cell with sector A. The subset may also exclude all sectors in cells 716–738 because they might not have a predetermined probability of handoff from sector A. The subset may also exclude sector B of cell 704 because it is in the initial list of sectors 302 received at the computer 304. The computer 304 may reduce the amount of sectors in the subset of sector A's neighbor set by excluding all sectors that are initially received in the list of sectors 302. Therefore, the subset of sector A's neighbor set may include all sectors within cells 704–714, excluding sector B of cell 704.

As shown at block 606, the computer 304 then applies a predetermined carrier frequency in all cells that encompass at least one sector in the subset. The predetermined carrier frequency may be applied to a first outer tier of cells and/or the predetermined carrier frequency may also be applied to a second outer tier, or any number of outer tiers, in the same manner as described above.

Referring to the example in combination with FIG. 7, the computer 304 may then apply a predetermined carrier frequency in all of the cells that encompass at least one sector in the subset of sector A's neighbor set, i.e., cells 704–714. In this manner, the computer 304 may apply a predetermined carrier frequency in a first outer tier of cells 740 of the cell 702 that encompasses sector A. The computer 304 may also apply the predetermined carrier frequency to cell 702.

The computer 304 may determine a second or another higher number outer tier (not illustrated) of the cell 702 that encompasses sector A and apply the predetermined carrier frequency to higher order outer tiers. For instance, in the example above, sectors in cells 716–738, that did not have a predetermined probability of handoff from sector A, may be defined as the second outer tier of cells of the cell that encompasses sector A and the computer 304 may apply the predetermined carrier frequency to these cells.

Method 600 allows for a predetermined carrier frequency to be applied to a number of cells that are each capable of handing off MSs to one another. Therefore it may be desired to apply a common carrier frequency to the number of cells in order to reduce hard handoff between these cells while also increasing capacity on these cells. For example, applying a common carrier frequency to the number of cells allows an MS traveling through the system to switch between cells in order to maintain communications with the system and still use the same carrier frequency. Also, by applying a common carrier frequency (or a different carrier frequency), the capacity of the cells will be increased because these cells may now be operated using a larger number of carrier frequencies, therefore, more MSs may communicate with these cells at the same time. However, a different carrier frequency may be applied to each of the number of cells in order to increase capacity on each of these cells.

In an alternate embodiment, the subset of a given sector's neighbor set may include sectors that are in the list of sectors 302 initially received and/or include sectors that share a common cell with the given sector. The computer 304 may not exclude any sectors within the list of sectors 302 or any sectors within a neighbor set of sectors from carrier addition. In this manner, the predetermined carrier frequency may be applied to more cells.

E. Other Examples

Those skilled in the art to which the present invention pertains may make modifications resulting in other embodiments employing principles of the present invention without departing from its spirit or characteristics. Accordingly, the described embodiments and examples are to be considered in all respects only as illustrative, and not restrictive, and the scope of the present invention is, therefore, indicated by the appended claims rather than by the foregoing description. Consequently, modifications apparent to those skilled in the art would still fall within the scope of the invention.

For example, while the foregoing description is presented in terms of cells and sectors, the method and system presented herein can be applied equally for any area of a wireless communication system. Also, other areas could be considered cells and/or sectors of the wireless communication system. Furthermore, the method and system presented herein can extend equally for use in any wireless communication network (e.g., time division multiple access (TDMA) network, frequency division multiple access (FDMA) network, code division multiple access (CDMA) network, etc.).

Additionally, while the foregoing description is presented in terms of applying a carrier frequency to cells, the method and system presented herein can be implemented by modifying and/or improving the capacity of cells using any capacity addition technique regardless of form and/or possibly regardless of how it is implemented in the system. Applying a carrier frequency to a cell is only one approach to capacity enhancement. Moreover, the capacity of cells may refer to the cells' abilities to provide services to a large amount of MSs (i.e., the cells' abilities to handle a large amount of wireless signal traffic). Other examples are possible as well.

We claim:

1. In a wireless communication system comprising a plurality of base stations each having a respective radiation pattern defining a cell encompassing one or more sectors, a method comprising:

receiving a first list of sectors each deemed to require additional capacity;

establishing a second list of all sectors in the first list that are each within a predefined distance of at least one other sector in the first list;

improving wireless signal traffic capacity of all cells that encompass at least one sector in the second list;

determining neighboring cells of all of the cells that encompass at least one sector in the second list, wherein the neighboring cells comprise a first outer surrounding tier of cells; and improving wireless signal traffic capacity of the neighboring cells.

2. In a wireless communication system comprising a plurality of base stations each having a respective radiation pattern defining a cell encompassing one or more sectors, a method comprising:

receiving a first list of sectors each deemed to require additional capacity;

establishing a second list of all sectors in the first list that are each within a predefined distance of at least one other sector in the first list;

determining neighboring sectors of all sectors in the second list, the neighboring sectors being nearest adjacent surrounding sectors of a given sector; and applying a predetermined carrier frequency in all cells that encompass at least one sector in the second list and at least one neighboring sector.

3. A computer readable medium having stored therein instructions for causing a central processing unit to execute the method of claim 2.

4. The method of claim 2, wherein establishing the second list of all sectors in the first list that are within the predefined distance of at least one other sector in the first list comprises determining a distance between each sector in the first list and each other sector in the first list and selecting pairs of sectors that are within the predefined distance of each other.

5. The method of claim 2, wherein applying the predetermined carrier frequency in all cells that encompass the at least one sector in the second list comprises, for each such cell, causing the base station of the cell to communicate on the predetermined carrier frequency.

6. The method of claim 2, wherein each sector in the first list of sectors has an assigned carrier frequency.

7. The method of claim 6, wherein applying the predetermined carrier frequency in all cells that encompass the at least one sector in the second list comprises re-tuning at least one of the assigned carrier frequencies.

8. The method of claim 6, wherein applying the predetermined carrier frequency in all cells that encompass the at least one sector in the second list comprises designating a frequency to transmit signals, the frequency being different from the assigned carrier frequencies.

9. The method of claim 2, wherein each respective cell of the cells that encompass at least one sector in the second list has one or more neighboring cells, the method further comprising identifying the one or more neighboring cells and applying the predetermined carrier frequency to the one or more neighboring cells.

10. The method of claim 9, wherein identifying the one or more neighboring cells comprises identifying cells that each have a predetermined probability of handoff from at least one of the cells that encompass the at least one sector in the second list.

11. In a wireless communication system comprising a plurality of base stations each having a respective radiation pattern defining a cell encompassing one or more sectors, a method comprising:
receiving a list of sectors, each given sector in the list having a respective neighbor set defining neighbor sectors each having a respective probability of handoff from the given sector; and
for each given sector in the list:
identifying a subset of the given sectors neighbor set, the subset defining sectors (i) that do not share a common cell with the given sector, (ii) that have at least a predetermined probability of handoff from the given sector, and (iii) that are not in the list of sectors, and
improving wireless signal traffic capacity of all cells that encompass at least one sector in the subset.

12. In a wireless communication system comprising a plurality of base stations each having a respective radiation pattern defining a cell encompassing one or more sectors, a method comprising:
receiving a list of sectors, each given sector in the list having a respective neighbor set defining neighbor sectors each having a respective probability of handoff from the given sector; and
for each given sector in the list:
identifying a subset of the given sector's neighbor set, the subset defining sectors (i) that do not share a common cell with the given sector, (ii) that have at least a predetermined probability of handoff from the given sector, and (iii) that are not in the list of sectors, and
applying a predetermined carrier frequency in all cells that encompass at least one sector in the subset.

13. A computer readable medium having stored therein instructions for causing a central processing unit to execute the method of claim 12.

14. The method of claim 12, wherein the list of sectors comprises sectors that are deemed to require additional capacity.

15. The method of claim 12, wherein receiving the list of sectors comprises identifying the neighbor sectors that have a respective distance between each other that is less than a predefined distance.

16. The method of claim 12, wherein each sector of the list of sectors has an assigned carrier frequency.

17. The method of claim 16, wherein applying the predetermined carrier frequency in all cells that encompass the at least one sector in the subset comprises re-tuning at least one of the assigned carrier frequencies.

18. The method of claim 16, wherein applying the predetermined carrier frequency in all cells that encompass the at least one sector in the subset comprises adding a frequency to transmit signals, the frequency being different from the assigned carrier frequencies.

19. The method of claim 12, further comprising applying the predetermined carrier frequency in all cells that encompass at least one sector in the list of sectors.

20. In a wireless communication system comprising a plurality of base stations each having a respective radiation pattern defining a cell encompassing one or more sectors, a method comprising:
(a) receiving a first list of sectors, each given sector in the first list being deemed to require additional capacity and having a respective neighbor set defining neighbor sectors each having a respective probability of handoff from the given sector;
(b) establishing a second list of all sectors in the first list that are within a predefined distance of at least one other sector in the first list; and
(c) for each given sector in the second list:
(i) identifying a subset of the given sector's neighbor set, the subset defining sectors that do not share a common cell with the given sector, that have at least a predetermined probability of handoff from the given sector, and that are not in the first list of sectors, and
(ii) applying a predetermined carrier frequency in all cells that encompass at least one sector in the subset.

21. A computer readable medium having stored therein instructions for causing a central processing unit to execute the method of claim 20.

22. The method of claim 20, wherein establishing the second list of all sectors in the first list that are within the predefined distance of at least one other sector in the first list comprises determining a distance between each sector in the first list and each other sector in the first list and selecting pairs of sectors that are within the predefined distance of each other.

23. The method of claim 22, wherein, for each given sector in the second list, identifying the subset of the given sectors neighbor set comprises identifying the pairs of sectors that each have neighbor sectors that are within a second predefined distance of the given sector.

24. A system comprising:
a processing unit; and
machine language instructions stored in data storage executable by the processing unit to perform functions including:
receiving a first list of sectors each deemed to require additional capacity, each sector in the first list being included in a cell that is defined by a respective radiation pattern;
establishing a second list of all sectors in the first list that are each within a predefined distance of at least one other sector in the first list;
applying a predetermined carrier frequency in all cells that encompass at least one sector in the second list;
determining neighboring cells of all of the cells that encompass at least one sector in the second list, wherein the neighboring cells comprise a first outer surrounding tier of cells; and
improving wireless signal traffic capacity of the neighboring cells.

25. A system comprising:

a processing unit; and machine language instructions stored in data storage executable by the processing unit to perform functions including:

receiving a list of sectors, each given sector in the list being included in a cell that is defined by a respective radiation pattern, each given sector in the list having a respective neighbor set defining neighbor sectors each having a respective probability of handoff from the given sector; and for each given sector in the list:

identifying a subset of the given sector's neighbor set, the subset defining sectors (i) that do not share a common cell with the given sector, (ii) that have at least a predetermined probability of handoff from the given sector, and (iii) that are not in the list of sectors, and applying a predetermined carrier frequency in all cells that encompass at least one sector in the subset.

26. A system comprising:

a processing unit; and machine language instructions stored in data storage executable by the processing unit to perform functions including:

(a) receiving a first list of sectors, each sector in the first list being included in a cell that is defined by a respective radiation pattern, each given sector in the first list being deemed to require additional capacity and having a respective neighbor set defining neighbor sectors each having a respective probability of handoff from the given sector;

(b) establishing a second list of all sectors in the first list that are within a predefined distance of at least one other sector in the first list; and (c) for each given sector in the second list:

(i) identifying a subset of the given sector's neighbor set, the subset defining sectors that do not share a common cell with the given sector, that have at least a predetermined probability of handoff from the given sector, and that are not in the first list of sectors, and (ii) applying a predetermined carrier frequency in all cells that encompass at least one sector in the subset.

27. A system comprising:

a base station having a number of antenna-arrangements each operable to provide a respective radiation pattern that defines a respective sector;

means for determining which of the respective sectors require additional capacity;

means for establishing a first list of sectors that are each within a predefined distance of at least one of the sectors that require additional capacity;

means for identifying a second list of sectors that each have a predetermined probability of handoff from the first list of sectors;

means for determining neighboring sectors of all sectors in the second list, the neighboring sectors being nearest adjacent surrounding sectors of a given sector; and means for applying a carrier frequency to the sectors that require additional capacity, to the first list of sectors, to the second list of sectors, and to at least one neighboring sectors.

28. The system of claim 27, wherein at least one of (i) the means for determining which of the respective sectors require additional capacity, (ii) the means for establishing the first list of sectors that are each within the predefined distance of the at least one of the sectors that require additional capacity, (iii) the means for identifying the second list of sectors that have the predetermined probability of handoff from the sectors that require additional capacity, and (iv) the means for applying the carrier frequency to the sectors that require additional capacity, to the first list of sectors, and to the second list of sectors is a processing unit operable to execute machine language instructions.

* * * * *